United States Patent
Dean et al.

(10) Patent No.: US 10,355,522 B2
(45) Date of Patent: Jul. 16, 2019

(54) MULTI-CONTROLLABLE HIGH VOLTAGE POWER SUPPLY SYSTEM

(71) Applicants: Craig Sean Dean, Dallas, TX (US); Lynn Edward Roszel, Wylie, TX (US); Scott Richard Wilson, Coram, NY (US); Erik Steven Haugarth, Plano, TX (US); Jan Simon Reuning, The Colony, TX (US)

(72) Inventors: Craig Sean Dean, Dallas, TX (US); Lynn Edward Roszel, Wylie, TX (US); Scott Richard Wilson, Coram, NY (US); Erik Steven Haugarth, Plano, TX (US); Jan Simon Reuning, The Colony, TX (US)

(*) Notice: Subject to any disclaimer, the term of this patent is extended or adjusted under 35 U.S.C. 154(b) by 0 days.

(21) Appl. No.: 16/025,163

(22) Filed: Jul. 2, 2018

(65) Prior Publication Data

US 2019/0190313 A1 Jun. 20, 2019

Related U.S. Application Data (63) Continuation of application No. 15/893,229, filed on Feb. 9, 2018, now abandoned, and a continuation-in-part of application No. 15/893,135, filed on Feb. 9, 2018, now Pat. No. 10,108,210.

(60) Provisional application No. 62/608,018, filed on Dec. 20, 2017, provisional application No. 62/608,016, filed on Dec. 20, 2017.

(51) Int. Cl.
*G05B 19/042* (2006.01)
*H02J 13/00* (2006.01)

(52) U.S. Cl.
CPC ........ *H02J 13/0013* (2013.01); *G05B 19/042* (2013.01); *G05B 2219/2639* (2013.01)

(58) Field of Classification Search
CPC ............... H02J 13/0013; G05B 19/042; G05B 2219/2639
See application file for complete search history.

(56) References Cited

U.S. PATENT DOCUMENTS

| | | | | |
|---|---|---|---|---|
| 5,369,356 A | * | 11/1994 | Kinney | G01R 21/133 324/142 |
| 2004/0210349 A1 | * | 10/2004 | Lenz | H02M 3/28 700/286 |
| 2013/0035802 A1 | * | 2/2013 | Khaitan | G06F 1/263 700/297 |
| 2013/0039104 A1 | * | 2/2013 | Sharma | H02M 1/10 363/123 |

(Continued)

*Primary Examiner* — Matthew V Nguyen
*Assistant Examiner* — Jye-June Lee
(74) *Attorney, Agent, or Firm* — Nolte Intellectual Property Law Group (57) ABSTRACT

A multi-controllable high voltage power supply having a plurality of filters, a high voltage divider, and a processor with memory. The memory contains operating set points. The processor is configured to receive scaled voltage feedback signals from the high voltage divider, compare the scaled voltage feedback signals to the plurality of operating set points in memory, compute and store revised operating set points using the compared scaled voltage feedback signal, use the revised operating set points to simultaneously and automatically regulate output voltage to be within all operating set points, and generate an alert when output conditions exceed any operating set points.

12 Claims, 4 Drawing Sheets

(56) References Cited

U.S. PATENT DOCUMENTS

2014/0265575 A1\* 9/2014 Shih .................. G05F 1/577
　　　　　　　　　　　　　　　　　　　　307/31
2017/0040802 A1\* 2/2017 Hopperdietzel ..... G01R 15/183

\* cited by examiner

MULTI-CONTROLLABLE HIGH VOLTAGE POWER SUPPLY SYSTEM

The present application is a Continuation in Part of U.S. patent application Ser. No. 15/893,135 filed on Feb. 9, 2018, "DIGITAL HIGH VOLTAGE POWER SUPPLY" (our reference 2296.004A), and a Continuation of U.S. patent application Ser. No. 15/893,229 filed on Feb. 9, 2018, entitled "MULTI-CONTROLLABLE HIGH VOLTAGE POWER SUPPLY SYSTEM" (our reference 2296.005A) and claims priority to and the benefit of U.S. Provisional Patent Application Ser. No. 62/608,016 filed on Dec. 20, 2017, entitled "DIGITAL CONTROLLED HIGH VOLTAGE POWER SUPPLY" (our reference 2296.004) and U.S. Provisional Patent Application Ser. No. 62/608,018 filed on Dec. 20, 2017, entitled "MULTI-CONTROLLABLE HIGH VOLTAGE POWER SUPPLY" (our reference 2296.005). These references are hereby incorporated in its entirety.

FIELD

The present embodiment generally relates to digital high voltage power supply.

BACKGROUND

A need exists for a digital power supply with improved performance and reduced cost compared to traditional analog counterparts.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present invention related to a digital high voltage power supply.

The digital high voltage power supply has a high voltage plant configured to receive a low voltage and generate a high voltage signal containing unwanted sinusoidal noise, the high voltage plant comprising at least one of: a transformer, a transistor, and a high voltage multiplier.

The digital high voltage power supply has a plurality of filters, wherein at least one filter is connected to the high voltage plant. The at least one filter forms a high voltage output.

The digital high voltage power supply has a high voltage divider to receive the high voltage output and generate a scaled voltage feedback signal.

The digital high voltage power supply has a processor with memory containing a plurality of operating set points. The processor is connected to the low voltage and the high voltage plant.

The processor is configured to: receive the scaled voltage feedback signal from the high voltage divider; compare the scaled voltage feedback signal to the plurality of operating set points in the memory; compute, store, revised operating set points using the compared scaled voltage feedback signal; use the revised operating set points to simultaneously and automatically regulate output voltage to be within all operating set points; and generate an alert as output signals when output conditions exceed any operating set points.

The present invention relates to a multi-controllable high voltage power supply.

The multi-controllable high voltage power supply comprises at least one of: an analog communication and a digital communication; wherein the analog communication contains a plurality of analog set points, and wherein the digital communication comprises a plurality of digital set points.

A high voltage power supply is in wired communication with the analog communication and in wired or wireless communication with the digital communication.

The high voltage power supply has a high voltage plant, configured to receive a low voltage. The high voltage plant has at least one of: a transformer, a transistor, and a high voltage multiplier.

The high voltage power supply has a plurality of filters, wherein at least one filter of the plurality of filters, is connected to the high voltage plant. At least one filter of the plurality of filters forms a high voltage output.

The high voltage power supply has a high voltage divider to receive the high voltage output and generate a scaled voltage feedback signal.

The high voltage power supply has a processor in communication with a memory, containing a plurality of operating set points. The processor is connected to the low voltage and the high voltage plant.

The processor is configured to: receive the scaled voltage feedback signal from the high voltage divider; compare the scaled voltage feedback signal to the plurality of operating set points in the memory; compute and store revised operating set points, using the compared scaled voltage feedback signal; and use the revised operating set points to simultaneously and automatically regulate high voltage output to be within all operating set points.

The digital high voltage power supply can prevent injury and casualties near a power supply by preventing spikes in the power supply, exceeding human endurance.

The digital high voltage power supply provides a clear feedback signal that reduces noise in the power supply. The digital high voltage power supply causes shut down of the power supply quickly and accurately to prevent fires and explosions in the event of a fault or explosive over-current condition due to high voltage.

In embodiments, the digital high voltage power supply has a digitally compensated circuit that can provide clean and accurate output. The digital high voltage power supply provides a stable power source for clear and accurate medical imaging applications, which can allow for early diagnosis of illness and medical conditions.

The digital high voltage power supply can provide a smaller sized power supply. The small size power supply enables the size and weight of medical equipment to be reduced. The small size power supply can be used in the case of natural disasters or man-made disasters.

In embodiments, the digital high voltage power supply can provide a stable power source for equipment that detects contraband. This stable and reliable long life power source can be used by the TSA and the National Security Administration to detect threats to national security.

The digital high voltage power supply can allow for a wider variable input voltage range so that a single machine can be deployed and relocated into many geographical areas. The digital high voltage power supply provides many voltages with a single lightweight, portable, transportable digital high voltage power supply. For instance, the power supply can be from 0.5 pounds to 10 pounds. The digital high voltage power supply enables multiple locations to be served sequentially without needing specially built machines for each location.

The digital high voltage power supply can be used for portable X-ray units to provide quick relief to devastated areas.

The following definitions are used herein:

The term "alert" can refer to a signal that specifies when a specific condition is met. For example, an alert can be an LED emitting light when the input voltage exceeds a high output voltage limit.

The term "communication protocol or discrete I/O signals" can refer to a signal or group of signal that are used to interact with the high voltage power supply. For example, the communication protocol can be a signal received from a feedback signal from a voltage divider or communications from a computer to turn the high voltage output on or off.

The term "digital high voltage power supply" can refer to a high voltage power supply in which digital technology is used within the feedback loop for control of the high voltage power supply. For example, a digital high voltage power supply can increase or decrease the high voltage output using an analog set point and prevent the system from undesired voltage variations in excess of 1 percent.

The term "filters" can refer to a device or substance that passes electric current of certain frequencies or frequency ranges while preventing the passage of other current at different frequencies or different frequency ranges. For example, a filter can be a device that removes white noise from a signal or removes small voltage variations from a sine wave.

The term "high voltage" describes a variable voltage platform with from 125 volts to 1 million volts allowing a user to select any of those voltages between 125 volts and 1 million volts on one platform, or have any one of those voltages in a separate voltage platform.

The term "high voltage divider" can refer to a passive linear circuit that produces an output voltage that is a fraction of the high voltage divider's input voltage. For example, a high voltage divider takes a high voltage and divides the high voltage, 6000 volts to a low voltage 3.3 volts that can be used by the high voltage power supply based on an analog set point or on a digital set point.

The term "high voltage multiplier" can refer to an arrangement of capacitors and rectifier diodes that is frequently used to generate high DC voltages. For example, high voltage multiplier can be a Cockcroft-Walton™ three stage series multiplier.

The term "high voltage output" is an electrical potential large enough to cause injury or damage to humans, wildlife, livestock or objects. Even though low voltage is incoming to the inventive power supply, the power supply can create a high voltage output. "High voltage output" can range from 100 Vdc up to 1,000,000 Vdc. The output voltage can be provided through a pin, cable, or a connector.

The term "high voltage plant" can refer to an arrangement of capacitors diodes and or transformers which in combination, produce high voltage. One example could be a high voltage transformer with a diode and a capacitor that produces 500 Vdc.

The term "low voltage" can refer to a voltage less then 100 Vdc. For example, a low voltage can be 24 Vdc for the input of the high voltage power supply or 3.3 Vdc for the scaled voltage feedback signal.

The term "memory" non-transitory computer readable medium, such as a solid state memory, and the like in communication with the processor.

The term "non-transitory computer readable medium" excludes any transitory signals but includes any non-transitory data storage circuitry, e.g., buffers, and cache, and wherein the non-transitory computer readable medium does not erase when power is removed from the device or the device is shut down.

The term "operating set points" can refer to the point at which the user wishes to operate. For example, the operating high voltage set-point can be set to 3000 V by the operator and the high voltage power supply will produce 3000 V.

The term "preset startup" can refer to a factory or user programmed start up condition. The power supply will power up and go to the exact factory programmed voltage set point for the high voltage output. This high voltage output can be anywhere from 0.001 percent to 100 percent of the power supply's capable output voltage.

The term "processor" refers to a computer, a field programmable gate array (FPGA), a complex programmable logic devices (CPLD) or a cloud based computing system. For example the processor can be a microprocessor.

The term "revised operating set points" can refer to the operating point that is set by the power supply based on an error calculation. If the operating set-point is set to 3000V but the power supply produces 3010 V the revised operating set-point from the power supply will then revise the operating set-point so that the output voltage will be 3000 V.

The term "scaled voltage feedback signal" can refer to the signal coming from a high voltage divider. The high voltage signal is scaled to a smaller workable voltage like 3.3 Vdc. The high voltage power supply can now use this signal to make adjustments.

The term "transformer," can refer to an electrical device consisting essentially of two or more windings wound on a single core, which by electromagnetic induction transforms electric energy from one set of one or more circuits, to another set of one or more circuits, such that the frequency of the energy remains unchanged and constant, while the voltage and current usually change. For example, the transformer on the high voltage power supply can convert 24 Vac to 1200 Vac.

The term "transistor' can refer to a device that regulates current or voltage flow and acts as a switch or gate for electronic signals. For example, a transistor can be a metal oxide field effect transistor (MOSFET) that operates as an "on off" power switch.

Figure 1:
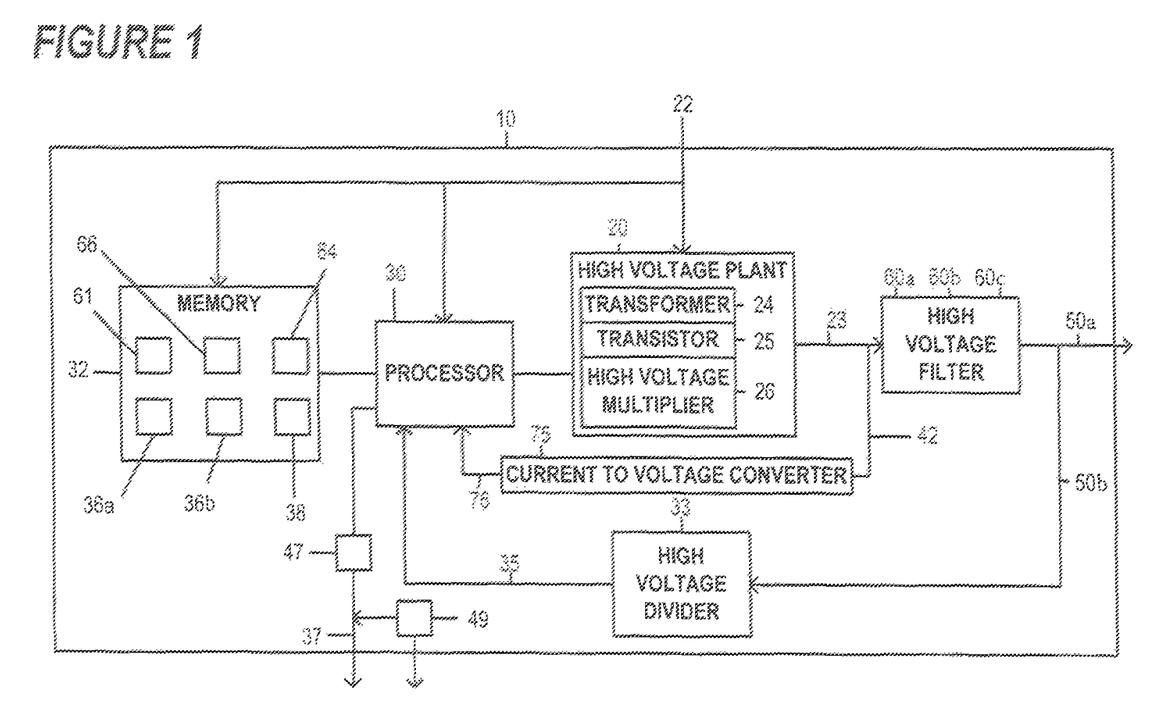
FIG. 1 depicts an overview of the digital high voltage power supply according to one or more embodiments.

Now turning to the Figures, FIG. 1 depicts an overview of the digital high voltage power supply 10.

The digital high voltage power supply 10 has a high voltage plant 20.

The high voltage plant 20 can be configured to receive a low voltage 22 and generate a high voltage signal containing unwanted sinusoidal noise 23.

The voltage plant 20 can have at least one of: a transformer 24, a transistor 25, and a high voltage multiplier 26.

In embodiments, the voltage plant 20 can have one transformer 24 connected to a transistor 25. In embodiments the voltage plant could have a plurality of transformers connected to a plurality of transistors, each pair connected in series and/or in parallel.

In embodiments, the voltage plant 20 can have a transformer 24 connected to a high voltage multiplier 26. In embodiments, the voltage plant can have a plurality of transformers connected to a plurality of high voltage multipliers, each pair connected in series and/or parallel.

In embodiments, the voltage plant 20 can have a transistor 25 connected to a transformer 24 connected to a high voltage multiplier 26. The set of transistor, transformer and high voltage multiplier can be connected in series or in parallel.

Multiples of transistors, transformers and high voltage multipliers can be used in embodiments. Each set of transistor, transformer and high voltage multiplier can be connected in series or in parallel to another set.

The digital high voltage power supply 10 has a plurality of filters 60a-60c, wherein at least one filter 60a-60c is connected to the high voltage plant 20.

In embodiments, at least one filter 60a can form a first high voltage output 50a and a second high voltage output 50b. In embodiments, a single high voltage output can be created.

In an embodiment, the first filter, 60a can be an inductive resistance capacitor filter "LRC filter" and connected in series to a second filter 60b that can be a resistance capacitor "RC" filter further connected in series to a third filter 60c, that can be another a RC resistance capacitance filter identical or different values from the second filter 60b.

The third filter, or last filter if only one, two or more than three are used, provides the high voltage output.

The high voltage output can be 4500 volts as the output.

A high voltage divider 33 can receive the high voltage output 50a and 50b and generate a scaled voltage feedback signal 35.

For example, the high voltage divider can receive a high voltage output of 1500 Vdc and generate a scaled voltage feedback signal 35 of 2 Vdc.

The digital high voltage power supply 10 can contain a processor 30 for example a microprocessor.

The processor 30 has memory 32 that can contain a plurality of operating set points 36, such as 3000 bit operating set points.

In embodiments, the processor 30 can be connected to the low voltage 22 and the high voltage plant 20.

The processor 30 can be configured to: receive the scaled voltage feedback signal 35 from the high voltage divider 33, compare the scaled voltage feedback signal 35 to the plurality of operating set points 36a-36b in the memory, compute and store, at least one revised operating set point 38 using the compared scaled voltage feedback signal 35, use the revised operating set point(s) 38 to simultaneously and automatically regulate high voltage output 50 to be within all operating set points; and generate an alert 37 when output conditions exceed any operating set points.

The operating set points are variable, based on user defined parameters.

In embodiments, at least one of the preset set points and the operating set points can be analog, digital or both analog and digital set points.

In embodiments, simultaneously, the alert 37 can be automatically transmitted through a communication protocol 47 or discrete I/O signals 49.

As an example, a usable communication protocol can be RS-232.

In embodiments, a ripple and digital hunting mitigation 61 can be located in the memory 32. An example of a ripple and digital hunting mitigation 61 is a known continuous frequency sine wave which needs to be removed from the output signal.

In embodiments, the memory 32 can contain a first preset value 64 for adjusting a speed at which the output voltage reaches an operating set point after output is enabled of the high voltage power supply and a second preset value 66 in memory for adjusting a speed at which the output voltage is adjusted due to changing current load conditions.

A second feedback loop 42 can be connected to a current to voltage converter 75 providing another feedback signal 76 to the processor 30. The feedback signal 76 is used to adjust a revised operating set point 38 in memory. The feedback signal 76 does not exceed one of the operating set points 36a-36b. As an example, a current to voltage converter can be a properly configured operational amplifier such as those available from Texas Instrumnents®.

In embodiments, the alert 37 can contain a plurality of communication signals, all operating simultaneously to convey different commands and data.

In embodiments, a preset value can adjust the speed at which the output voltage reaches an operating set point after output is enabled of the high voltage power supply and a speed at which the output voltage is adjusted due to changing load conditions.

Figure 2:
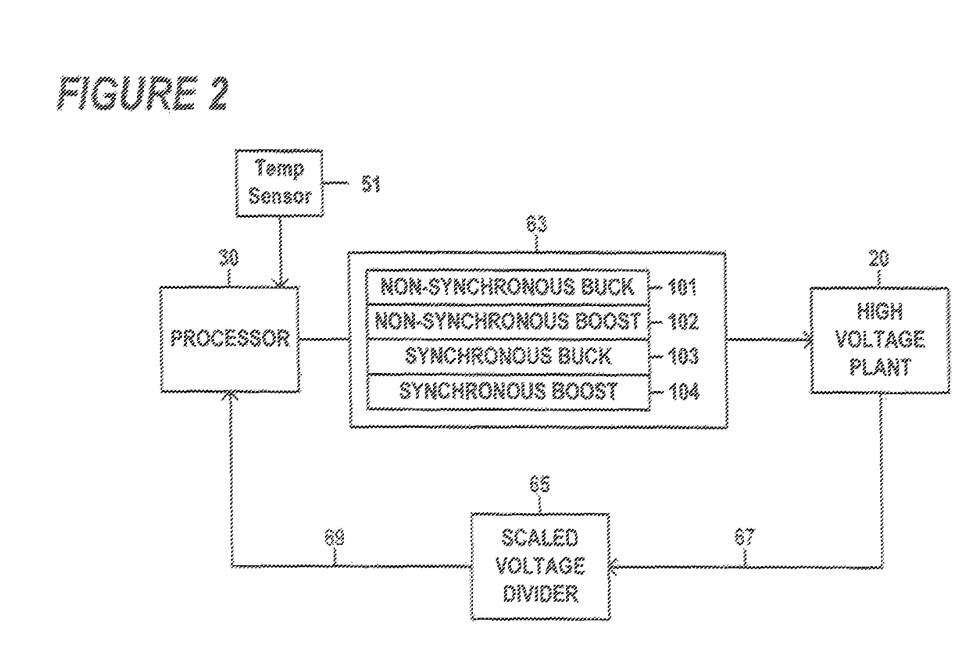
FIG. 2 depicts a second power supply according to one or more embodiments.

FIG. 2 depicts a second power supply 63 electrically connected between the processor 30 and the high voltage plant 20.

A temperature sensor 51 can be connected to the processor. The temperature sensor is used to detect temperature around components of the power supply.

A voltage divider 65 can be configured to receive a second voltage output 67 from the high voltage plant, and generate a second scaled voltage feedback signal 69.

For example, if the first voltage output 67 is 2000 Vdc, the second scaled voltage feedback signal 69 can be 10 Vdc, as generated by the voltage divider 65.

In embodiments, a non-synchronous buck 101, a non-synchronous boost 102, a synchronous buck 103, or a synchronous boost 104 can each operate as the second power supply 63.

For example, a non-synchronous buck 101 in the power supply can be a voltage converter that converts a voltage from 24 Vdc to 19 Vdc.

For example, a non-synchronous boost 102 in the power supply can be can be a voltage converter that converts a voltage from 24 Vdc to 36 Vdc.

For example, a synchronous buck 103 usable in the power supply can be a voltage converter that converts a voltage from 29 Vdc to 15 Vdc.

For example, a synchronous boost 104 usable in the power system can be a voltage convert that converts a voltage from 12 Vdc to 28 Vdc.

Figure 3A:
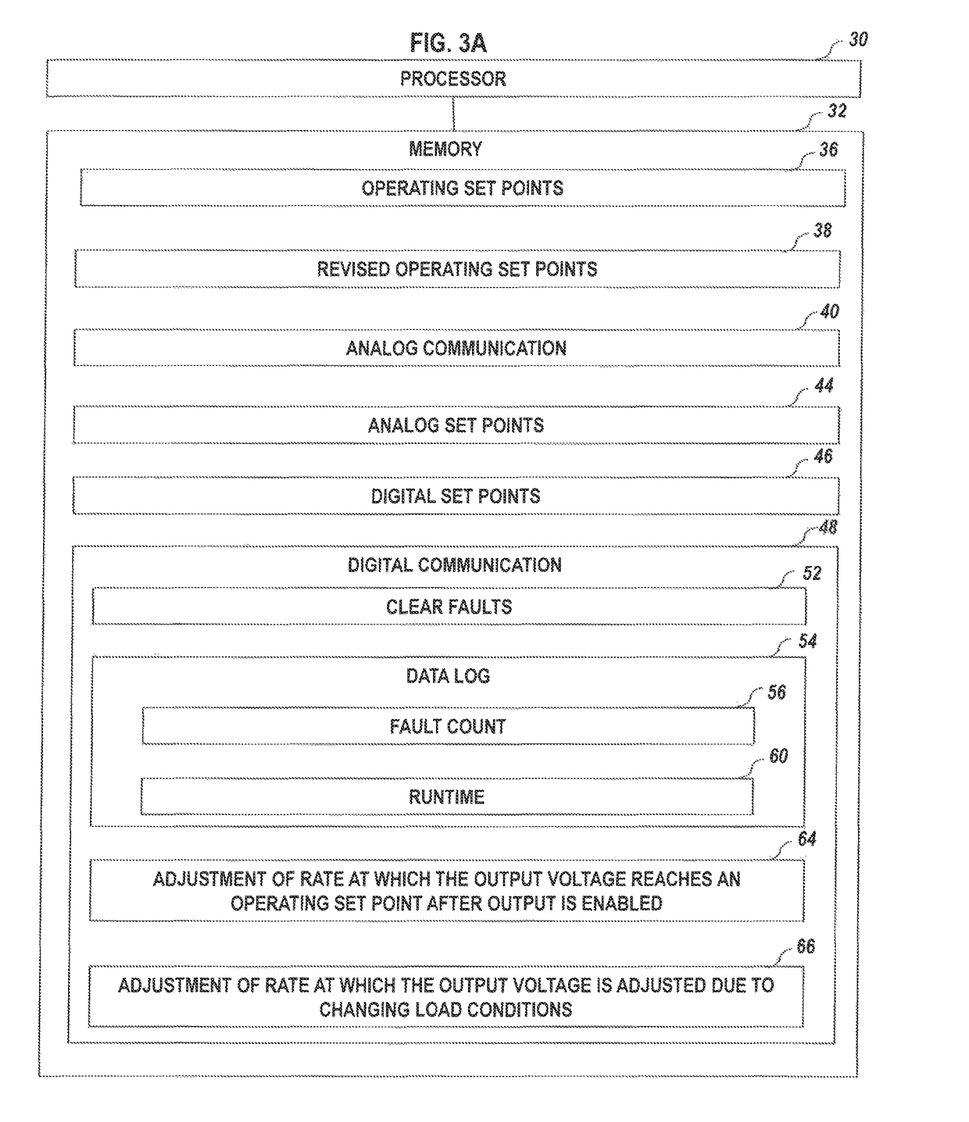
FIGS. 3A and 3B depicts a memory connected to a processor according to one or more embodiments.
Figure 3B:
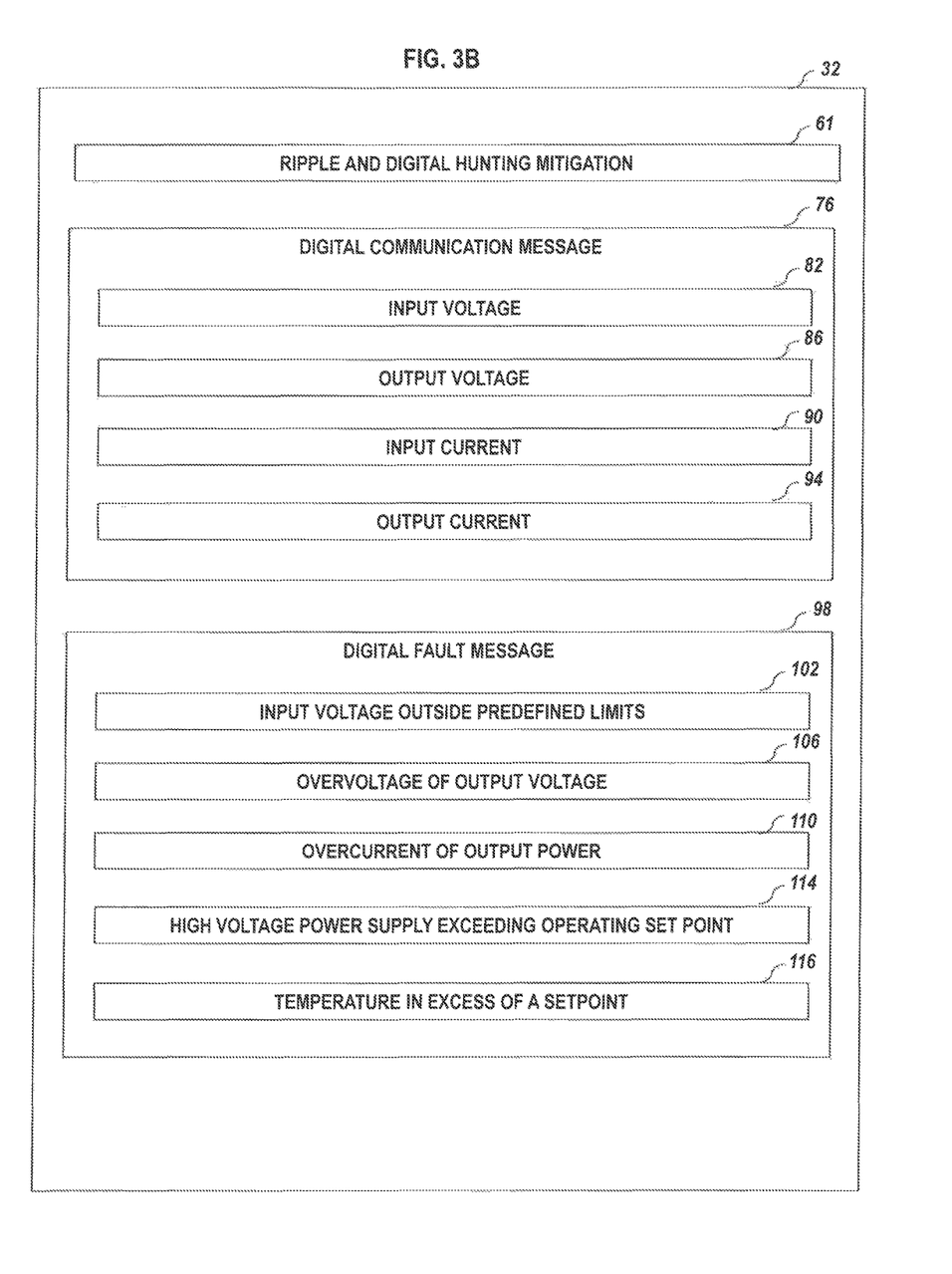

FIGS. 3A and 3B depict the processor in communication with the memory.

The memory 32 can contain a at least one operating set points 36, one or more revised operating set points 38, one or more analog set points 44, one or more digital set points 46, and a ripple and digital hunting mitigation 61.

In embodiments, the memory can contain a value that corresponds to an analog communication 40, an analog signal that can be used to generate high voltage output based on one of several set points in memory.

In embodiments, the memory can contain a value that corresponds to a digital communication 48, a digital signal, which can be used to generate high voltage output based on one of several set points in memory.

The digital communication 48 can include a communication to clear faults 52, resume create or resume a high voltage power supply data log 54 containing at least one of: a fault count 56 and a run time 60. Any signal information from the power supply can be processed or contained in the data log.

For example, the data log can contain for a 24 hour period, 34 faults counts each having a run time of 3 seconds. This data log is an incredibly versatile feature of the invention, and the data log can be set up in a wide variety of ways for types of faults, length of time of faults and even have historical comparative data over time.

In embodiments, the digital communication can include a signal for adjustment of rate at which the output voltage reaches an operating set point after high voltage output is enabled 64.

In embodiments, the digital communication can include a signal for adjustment of rate at which the output voltage is changed due to changing load conditions 66.

A digital communication message 76 can be located in the memory 32 of the processor 30 and transmitted by wire or wireless communication such as to a client device that is a computer connected to a network, to indicate to a user: an actual input voltage 82, an actual output voltage 86, an actual input current 90, and an actual output current 94 at any given time (in real time) and/or at a preset voltage set point or preset current set point. The communication message may be temperature in embodiments. The communication message may be any piece of data that the memory contains which is in communication with the processor.

In embodiments, the power supply produces a digital fault message 98 from the processor indicating fault conditions of the high voltage power supply.

The fault conditions can be but are not limited to at least one of: input voltage outside predefined limits 102, overvoltage of output voltage 106, and overcurrent of output power 110; temperature in excess of a set point 116.

As an example, the input voltage outside predefined limits 102 can be a voltage less than 10 Vdc.

As an example, the overvoltage of output voltage 106 can be a voltage greater than 6000 Vdc.

As an example, the overcurrent of output power 110 can be a current greater than a specific current set point like greater than a 5 milliamp set point.

As an example, the temperature in excess of a set point 116 can be a temperature greater than 60 degrees Celsius.

In embodiments, the multi-controllable high voltage power supply can have the ability to adjust automatically a drive frequency of the high voltage plant.

In embodiments, the digital communication can provide remote control of the high voltage power supply via a wireless communication using a network. The network can be the internet, a local area network, a wide area network, a satellite network, a cellular network or combinations thereof.

In embodiments, the multi-controllable high voltage power supply can utilize a digital communication and an analog communication simultaneously in a control free version.

Seven different examples of the power supply follow:

Example 1: Digital High Voltage Power Supply with a Plastic Case

In embodiments, the digital high voltage power supply is contained in a plastic case that is sealed. The digital high voltage power can weigh ½ to 2 pounds.

A high voltage plant is in the case that can be attached to the case, such as with epoxy. The high voltage plant in this example receive a low voltage such as 12 volts DC.

The high voltage plant converts the 12 volts to a high voltage signal such as 1000 Vac containing unwanted sinusoidal noise such as a 6 Vac signal which is like static on a phone call.

The high voltage plant can contain a transformer that converts the 12 volts to the 1000 volts or a voltage step up device, which does the same voltage conversion, but differently.

The high voltage plant contains a transistor such as a MOSFET transistor which pulls the low voltage 12 volts current through the transformer and creates a magnetic field that controls the passage of the voltage like a water valve connected to a water pipe.

The high voltage plant contains a high voltage multiplier such as a 6 times multiplier which multiplies the voltage from the transformer to the high voltage signal which is 6 times the transformer voltage. An example of a high voltage plant can be a standard series multiplier made by Dean Technology of Addison, Tex.

In this example, two filters are used. A first filter connects to the high voltage plant and the second filter connects to the high voltage plant in series with the first filter.

The second filter forms a high voltage output.

The first filter in this example can be a combination of an inductor, such as a 10 microhenry inductor, and a capacitor such as a 1 microfarad capacitor connected together in parallel to each other with a ground.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in case and electrically connected between the high voltage signal and produces a scaled voltage feedback signal. The high voltage divider is formed from a plurality of resistors connected in series. The high voltage divider can use different size resistors, such as one 10 giga ohm resistor and one 10 kilo ohm resistor.

The high voltage divider is configured to receive the high voltage output of 1000 volts and generate a scaled voltage feedback signal of 3 volts DC.

A processor, such as a microprocessor with programmable peripherals, and various hardware features and memory.

The memory for this example contains 4096 operating set points. Some of the step points are a specific voltage or current that the power supply can be set to for operation. Other set points are time intervals, or restart intervals, shut down lengths of time. For example, a specific voltage can be changed from 2000 volts to 5000 volts by entering a user defined value into the memory of the processor.

An example of a time interval set point can be stay on for 5 minutes.

An example of a restart interval can be attempt to restart every one second.

An example of shutdown lengths of time can be stay off for 5 seconds.

The processor is connected to the low voltage and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor computes at least one revised operating set point of a higher or lower voltage depending on the needs of the customer, such as a computation of 4000 volts or 1000 volts, like and A-D value of 2000 or 4096.

The processor uses the revised operating set point to simultaneously and automatically regulate high output voltage within all operating set points.

Example 2: Digital High Voltage Power Supply with Open Board

In an embodiment the digital high voltage power supply is contained in an open board that is sealed. The digital high voltage power can weigh 1½ to 2 pounds.

In the case is a high voltage plant that can be attached to the case, such as with epoxy. The high voltage plant in this example, receives a low voltage such as 12 volts DC.

The high voltage plant converts the 12 volts to a high voltage signal such as 1000 volts DC containing unwanted sinusoidal noise, such as a 6 volt AC signal which is like static on a phone call.

The high voltage plant contains a transformer such as transform that converts the 12 volts to the 1000 volts or a voltage step up device can be used which does the same voltage conversion, but differently.

The high voltage plant contains a transistor such as a MOSFET transistor which pulls the low voltage 12 volts current through the transformer and creates a magnetic field that controls the passage of the voltage like a water valve connected to a water pipe.

The high voltage plant contains a high voltage multiplier such as a 6 times multiplier which multiplies the voltage from the transformer to the high voltage signal which is 6 times the transformer voltage. An example of a high voltage plant can be a standard series multiplier made by Dean Technology of Addison, Tex.

In this example, two filters are used. A first filter connects to the high voltage plant and the second filter connects to the high voltage plant in series with the first filter.

The second filter forms a high voltage output.

The first filter in this example can be a combination of an inductor, such as a 10 microhenry inductor, and a capacitor such as a 1 microfarad capacitor connected together in parallel to each other with a ground.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in case and electrically connected between the high voltage signal and produces a scaled voltage feedback signal. The high voltage divider is formed from a plurality of resistors connected in series. The high voltage divider can use different size resistors, such as one 10 giga ohm resistor and one 10 kilo ohm resistor.

The high voltage divider is configured to receive the high voltage output of 1000 volts and generate a scaled voltage feedback signal of 3 Vdc.

A processor, such as a microprocessor with programmable peripherals, and various hardware features and memory.

The memory for this example contains 4096 operating set points. Some of the set points are a specific voltage or current that the power supply can be set to for operation. Other set points are time intervals, or restart intervals, shut down lengths of time. For example, a specific voltage can be changed from 2000 volts to 5000 volts by entering a user defined value into the memory of the processor.

An example of a time interval set point can be stay on for 5 minutes.

An example of restart intervals can be attempt to restart every one second.

An example of a shut down lengths of time can be stay off for 5 seconds.

The processor is connected to the low voltage and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor computes at least one revised operating set point of a higher or lower voltage depending on the needs of the customer, such as a computation of 4000 volts or 1000 volts, like and A-D value of 2000 or 4096.

The processor uses the revised operating set point to simultaneously and automatically regulate high output voltage within all operating set points.

Example 3: Digital High Voltage Power Supply with Metal Case

In an embodiment the digital high voltage power supply is contained in a metal case that is sealed. The digital high voltage power can weigh 2 pounds to 3 pounds.

In the case is a high voltage plant that can be attached to the case, such as with epoxy. The high voltage plant, in this example, receives a low voltage such as 12 Vdc.

The high voltage plant converts the 12 volts to a high voltage signal such as 1000 volts DC containing unwanted sinusoidal noise such as a 6 Vac signal which is like static on a phone call.

The high voltage plant contains a transformer such as transform that converts the 12 volts to the 1000 volts or a voltage step up device can be used which does the same voltage conversion, but differently.

The high voltage plant contains a transistor such as a MOSFET transistor which pulls the low voltage 12 volts current through the transformer and creates a magnetic field that controls the passage of the voltage like a water valve connected to a water pipe.

The high voltage plant contains a high voltage multiplier such as a 6 times multiplier which multiplies the voltage from the transformer to the high voltage signal which is 6 times the transformer voltage. An example of a high voltage plant can be a standard series multiplier made by Dean Technology of Addison, Tex.

In this example, 2 filters are used. A first filter connects to the high voltage plant and the second filter connects to the high voltage plant in series with the first filter.

The second filter forms a high voltage output.

The first filter in this example can be a combination of an inductor, such as a 10 microhenry inductor, and a capacitor such as a 1 microfarad capacitor connected together in parallel to each other with a ground.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in case and electrically connected between the high voltage signal and produces a scaled voltage feedback signal. The high voltage divider is formed from a plurality of resistors connected in series. The high voltage divider can use different size resistors, such as one 10 giga ohm resistor and one 10 kilo ohm resistor.

The high voltage divider is configured to receive the high voltage output of 1000 volts and generate a scaled voltage feedback signal of 3 Vdc.

A processor, such as a microprocessor with programmable peripherals, and various hardware features and memory.

The memory for this example contains 4096 operating set points. Some of the step points are a specific voltage or current that the power supply can be set to for operation. Other set points are time intervals, or restart intervals, shut down lengths of time. For example, a specific voltage can be changed from 2000 volts to 5000 volts by entering a user defined value into the memory of the processor.

An example of a time interval set point can be stay on for 5 minutes.

An example of a restart interval can be attempt to restart every one second.

An example of shutdown lengths of time can be stay off for 5 seconds.

The processor is connected to the low voltage and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor computes at least one revised operating set point of a higher or lower voltage depending on the needs of the customer, such as a computation of 4000 volts or 1000 volts, like and A-D value of 2000 or 4096.

The processor uses the revised operating set point to simultaneously and automatically regulate high output voltage within all operating set points.

Example 4: Controlling Voltage by Analog Communication and Controlling Current by Analog Communication In this example of the multi-controllable high voltage power supply, two analog communications are used.

The first analog communications for controlling voltage has a plurality of analog set points; such as set point of 5 volts to generate 6 kV, set point of 1 volt to generate 1 kV, and a set point of 2.5 volts to generate 3 kV.

The second analog communication can be a plurality of analog set points to control current. For example, the second analog communication can include: a set point of 5 volts to generate 5 mA, a set point of 1 volt to generate 1 mA, and a set point of 2.5 volts to generate 2.5 mA.

The high voltage power supply is in wired communication with the analog communication.

In an embodiment the digital high voltage power supply is contained in a plastic case that is sealed. The digital high voltage power supply can weigh 2 to 2 pounds.

In the case is a high voltage plant that can be attached to the case, such as with epoxy. In this example, the high voltage plant receives a low voltage such as 12 volts AC.

The high voltage plant converts the 12 volts AC to a high voltage signal such as 6000 volts DC containing unwanted sinusoidal noise such as a 6 volt AC signal which is like static on a phone call.

The high voltage plant contains a transformer that converts the 12 Vac to 1000 Vac or a voltage step up device can be used which does the same voltage conversion, but differently.

The high voltage plant contains a transistor such as a MOSFET transistor which pulls an input low voltage 12 Vdc current through the transformer and creates a magnetic field that controls the passage of the voltage like a water valve connected to a water pipe creating 12 Vac.

The high voltage plant contains a high voltage multiplier such as a 6 times multiplier which multiplies the voltage from the transformer 1000 V to a higher voltage signal which is 6 times the transformer voltage to 6000 Vdc.

An example of a high voltage plant can be a standard series multiplier made by Dean Technology of Addison, Tex.

In this example, two different filters are used.

A first filter connects to the high voltage plant and the second filter connects to the high voltage plant in series with the first filter.

The second filter forms a high voltage output which can be 6000 Vdc.

The first filter, in this example, can be a combination of an inductor, such as a 10 microhenry inductor, and a capacitor such as a 1 microfarad capacitor connected together in parallel to each other.

The second filter can be a combination of a resistor in series with the first filter and a capacitor connected with a ground.

The resistor of the second filter can be a 10 kilo ohm resistor. The capacitor in the second filter can be a 2 microfarad capacitor.

The high voltage divider is in the plastic case and electrically connected to receive the high voltage output and produce a scaled voltage feedback signal.

A usable high voltage divider can be formed from a plurality of resistors connected in series. The high voltage divider can use different size resistors, such as one 10 giga ohm resistor and one 10 kilo ohm resistor.

The high voltage divider is configured to receive the high voltage output, such as 6000 volts and generate a scaled voltage feedback signal such as 3 volts DC.

A processor, such as a microprocessor with programmable peripherals, and various hardware features and memory is used in the case.

The processor is connected to memory, which for this example contains 4096 bits of operating set points.

Some of the usable operating set points are a specific voltage or a specific current.

Other set points are time intervals, or restart intervals, or even shut down lengths of time. For example, operating set points can be changed from 2000 volts to 5000 volts by entering a user defined value into the memory of the processor.

An example of a time interval set point can be "stay on for 5 minutes".

An example of a restart interval can be "attempt to restart every one second".

An example of a shutdown lengths of time can be "stay off for 5 seconds".

The processor is connected to the low voltage input and the high voltage plant.

The processor is configured to: receive the scaled voltage feedback signal from the high voltage divider, compare the scaled voltage feedback signal to the plurality of operating set points in memory, and compute and store in memory at least one revised operating set point using the compared scaled voltage feedback signal.

On occasion, the processor may not need to store a new value and simply performs a compare of output to set point, and if the compared value is equivalent to the prior value, no change in set point is needed.

For example, the processor can computes revised operating set point of a higher or lower voltage depending on the needs of the customer. For example, the processor can perform a computation of 6000 volts or 1000 volts, like and A-D value of 2000 bits or 4096 bits.

The processor uses the revised operating set point to simultaneously and automatically regulate high voltage output within all operating set points.

Example 5: Controlling Voltage by Digital Communication and Controlling Current by Analog Communication In this example of the multi-controllable high voltage power supply, one analog and one digital communication is used.

The digital communication for controlling voltage has a plurality of digital set points; such as digital set point of 4096 bits to generate 6 kV, a second digital set point of 500 bits to generate 1 kV, and a third digital set point of 2048 bits to generate 3 kV.

The analog communication for controlling current can have a plurality of analog set points to control current.

For example, the plurality of set points can include: a first current set point of 5 volts to generate 5 mA, a second current set point of 1 volt to generate 1 mA, and a third current set point of 2.5 volts to generate 2.5 mA.

The high voltage power supply is in wired communication with the analog communication and in wired communication with the digital communication.

In an embodiment the digital high voltage power supply is contained in a metal case that is sealed. The digital high voltage power supply can weigh 1 pound.

In the case, a high voltage plant can be attached, such as with epoxy. The high voltage plant in this example receives a low voltage such as 24 volts AC.

The high voltage plant converts the low voltage of 24 volts AC to a high voltage signal such as 6000 volts DC containing unwanted sinusoidal noise, such as a 6 volt AC signal similar to static on a phone call.

The high voltage plant contains a transformer such as transformer that converts the 24 volts AC to 1500 volts AC or a voltage step up device can be used which does the same voltage conversion, but differently.

The high voltage plant contains a transistor, such as a MOSFET transistor which pulls the low voltage 24 volts AC current through the transformer and creates a magnetic field that controls the passage of the voltage like a water valve connected to a water pipe.

The high voltage plant contains a high voltage multiplier, such as a 4 times multiplier, which multiplies the voltage from the transformer 1500 volts AC to the high voltage signal which is 4 times the transformer voltage to 6000 volts DC.

An example of a high voltage plant can be a series-parallel multiplier made by Dean Technology of Addison, Tex.

In this example, two filters are used.

A first filter connects to the high voltage plant and the second filter connects to the high voltage plant in series with the first filter.

The second filter forms a high voltage output.

The first filter, in this example, can be a combination of an inductor, such as a 10 microhenry inductor, and a capacitor such as a 1 microfarad capacitor connected together in parallel with each other.

The second filter can be a combination of a resistor in series with the first filter and a capacitor connected with a ground. The resistor can be an 8 kilo ohm resistor. The capacitor in the second filter can be a 1000 picofarad capacitor.

The high voltage divider is in the case and electrically connected between the high voltage signal. The high voltage divider produces a scaled voltage feedback signal. The high voltage divider is formed from a plurality of resistors connected in series. The high voltage divider can use different size resistors, such as one 5 mega ohm resistor and one 5 kilo ohm resistor.

The high voltage divider is configured to receive the high voltage output of 4000 Vdc and generate a scaled voltage feedback signal of 2 Vdc.

A processor, such as a microprocessor with programmable peripherals, and various hardware features and memory can be used and in the case.

The memory for this example contains 4096 bits of operating set points.

Some of the usable operating set points are a specific voltage or a specific current.

Other set points are time intervals, or restart intervals, or even shut down lengths of time. For example, operating set points can be changed from 1000 volts to 4000 volts by entering a user defined value into the memory of the processor.

An example of a time interval set point can be "stay on for 10 minutes".

An example of a restart interval can be "attempt to restart every one second".

An example of a shutdown lengths of time can be "stay off for 20 seconds".

The processor is connected to the low voltage input and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor can computes revised operating set point of a higher or lower voltage depending on the needs of the customer. For example, the processor can perform a computation of 4000 volts or 1000 volts, like and A-D value of 2000 bits or 4096 bits.

The processor uses the revised operating set point to simultaneously and automatically regulate high voltage output within all operating set points.

Example 6: Controlling Voltage by Analog and Controlling Current by Digital

In this example of the multi-controllable high voltage power supply, one analog and one digital communication is used.

The analog communication for controlling voltage has a plurality of analog set points to control voltage.

For example, the plurality of set points can include: a first voltage set point of 4 volts to generate 4.5 kV, a second voltage set point of 2 volt to generate 2.1 kV, and a third current set point of 0.5 volts to generate 500 volts The digital communication for controlling current has a plurality of digital set points; such as digital set point of 4096 bits to generate 5 mA, a second digital set point of 1024 bits to generate 1 mA, and a third digital set point of 2048 bits to generate 2.5 mA.

The high voltage power supply in wired communication with the analog communication and in wireless communication with the digital communication.

In an embodiment the digital high voltage power supply is contained in a plastic case that is sealed. The digital high voltage power supply can weigh 3 pounds.

In the case is a high voltage plant that can be attached to the case, such as with epoxy. The high voltage plant, in this example, receives a low voltage such as 18 volts DC.

In this case, a high voltage plant can be attached, such as with epoxy. The high voltage plant in this example receives a low voltage such as 18 volts AC.

The high voltage plant converts the low voltage of 18 volts AC to a high voltage signal such as 4500 volts DC containing unwanted sinusoidal noise, such as a 10 volt AC signal similar to static on a phone call.

The high voltage plant contains a transformer such as transformer that converts the 18 volts AC to 560 AC volts or a voltage step up device can be used which does the same voltage conversion, but differently.

The high voltage plant contains a transistor, such as a MOSFET transistor which pulls the low voltage 18 volts AC current through the transformer and creates a magnetic field that controls the passage of the voltage like a water valve connected to a water pipe.

The high voltage plant contains a high voltage multiplier, such as a 8 times multiplier, which multiplies the voltage from the transformer 560 volts AC to the high voltage signal which is 8 times the transformer voltage to 4500 volts DC.

An example of a high voltage plant can be a standard parallel multiplier made by Dean Technology of Addison, Tex.

In this example, two filters are used.

A first filter connects to the high voltage plant and the second filter connects to the high voltage plant in series with the first filter.

The second filter forms a high voltage output.

The first filter, in this example can be a combination of an inductor, such as a 10 microhenry inductor, and a capacitor such as a 1 microfarad capacitor connected together in parallel with each other.

The second filter can be a combination of a resistor in series with the first filter and a capacitor connected with a ground. The resistor can be a 10 kilo ohm resistor. The capacitor in the second filter can be a 2 microfarad capacitor.

The high voltage divider is in the case and electrically connected between the high voltage signal. The high voltage divider produces a scaled voltage feedback signal. The high voltage divider is formed from a plurality of resistors connected in series. The high voltage divider can use different size resistors, such as one 10 giga ohm resistor and one 10 kilo ohm resistor.

The high voltage divider is configured to receive the high voltage output of 1000 Vdc and generate a scaled voltage feedback signal of 3 Vdc.

A processor, such as a microprocessor with programmable peripherals, and various hardware features and memory can be used and in the case.

The memory for this example contains 4096 bits of operating set points.

Some of the usable operating set points are a specific voltage or a specific current.

Other set points are time intervals, or restart intervals, or even shut down lengths of time. For example, operating set points can be changed from 2000 volts to 5000 volts by entering a user defined value into the memory of the processor.

An example of a time interval set point can be "stay on for 1 minutes".

An example of a restart interval can be "attempt to restart every two seconds".

An example of a shutdown length of time can be "stay off for 18 seconds".

The processor is connected to the low voltage input and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor can computes revised operating set point of a higher or lower voltage depending on the needs of the customer. For example, the processor can perform a computation of 4000 volts or 2000 volts, like and A-D value of 500 bits or 2000 bits.

The processor uses the revised operating set point to simultaneously and automatically regulate high voltage output within all operating set points.

The processor uses the revised operating set point to simultaneously and automatically regulate high voltage output within all operating set points.

Example 7: Controlling Voltage by Digital and Controlling Current by Digital

In this example of the multi-controllable high voltage power supply, two digital communications are used.

The first digital communication for controlling voltage has a plurality of digital set points; such as digital set point of 4096 bits to generate 6 kV a second digital set point of 1000 bits to generate 1 kV, and a third digital set point of 2048 bits to generate 3 kV.

The second digital communication for controlling current has a plurality of digital set points; such as digital set point of 4096 bits to generate 5 mA a second digital set point of 1000 bits to generate 1 mA, and a third digital set point of 2048 bits to generate 2.5 mA.

The high voltage power supply in wireless communication with both of the digital communications. In another example, the high voltage power supply can be in wired communication with both of the digital communications. In still a third example, the high voltage power supply can be wired to one of the digital communications and wireless to the second digital communication.

In an embodiment the digital high voltage power supply is contained in a plastic case that is sealed. The digital high voltage power can weigh 5 pounds.

In the case, a high voltage plant can be attached, such as with epoxy. The high voltage plant in this example receives a low voltage such as 10 volts AC.

The high voltage plant converts the low voltage of 10 volts AC to a high voltage signal such as 2000 volts DC containing unwanted sinusoidal noise, such as a 20 volt AC signal similar to static on a phone call.

The high voltage plant contains a transformer such as transformer that converts the 10 volts AC to 2000 volts AC or a voltage step up device can be used which does the same voltage conversion, but differently.

The high voltage plant contains a transistor, such as a MOSFET transistor which pulls the low voltage 10 volts AC current through the transformer and creates a magnetic field, that controls the passage of the voltage like a water valve connected to a water pipe.

The high voltage plant contains a high voltage multiplier, such as a 3 times multiplier, which multiplies the voltage from the transformer 2000 volts AC to the high voltage signal which is 3 times the transformer voltage to 6000 volts DC.

An example of a high voltage plant can be a standard parallel multiplier made by Dean Technology of Addison, Tex.

In this example, two filters are used.

A first filter connects to the high voltage plant and the second filter connects to the high voltage plant in series with the first filter.

The second filter forms a high voltage output.

The first filter, in this example can be a combination of an inductor, such as a 100 microhenry inductor, and a capacitor such as a 10 microfarad capacitor connected together in parallel with each other.

The second filter can be a combination of a resistor in series with the first filter and a capacitor connected with a ground. The resistor can be a 11 kilo ohm resistor. The capacitor in the second filter can be a 3 microfarad capacitor.

The high voltage divider is in the case and electrically connected between the high voltage signal. The high voltage divider produces a scaled voltage feedback signal. The high voltage divider is formed from a plurality of resistors connected in series. The high voltage divider can use different size resistors, such as one 12 giga ohm resistor and one 12 kilo ohm resistor.

The high voltage divider is configured to receive the high voltage output of 1000 Vdc and generate a scaled voltage feedback signal of 3 Vdc.

A processor, such as a microprocessor with programmable peripherals, and various hardware features and memory can be used and in the case.

The memory for this example contains 4096 bits of operating set points.

Some of the usable operating set points are a specific voltage or a specific current.

Other set points are time intervals, or restart intervals, or even shut down lengths of time. For example, operating set points can be changed from 2000 volts to 5000 volts by entering a user defined value into the memory of the processor.

An example of a time interval set point can be "stay on for 5 minutes".

An example of a restart interval can be "attempt to restart every one second".

An example of a shutdown length of time can be "stay off for 5 seconds".

The processor is connected to the low voltage input and the high voltage plant.

The processor is configured to: receive the scaled voltage feedback signal from the high voltage divider; compare the scaled voltage feedback signal to the plurality of operating set points in memory; compute and store in memory, at least one revised operating set point using the compared scaled voltage feedback signal.

For example, the processor can computes revised operating set point of a higher or lower voltage depending on the needs of the customer. For example, the processor can perform a computation of 4000 volts or 1000 volts, and A-D value of 2000 bits or 4096 bits.

The processor uses the revised operating set point to simultaneously and automatically regulate high voltage output within all operating set points.

The processor uses the revised operating set point to simultaneously and automatically regulate high voltage output within all operating set points.

While these embodiments have been described with emphasis on the embodiments, it should be understood that within the scope of the appended claims, the embodiments might be practiced other than as specifically described herein.

What is claimed is:

1. A multi-controllable high voltage power supply comprising:
   a. an analog communication to drive a digital communication simultaneously, wherein the analog communication comprises: at least one analog set point; and wherein the digital communication comprises: at least one digital set point;
   b. a digital high voltage power supply in wired communication with the analog communication and in wired or wireless communication with the digital communication, the high voltage power supply comprising:
      (i) a high voltage plant configured to receive a low voltage and generate a high voltage signal containing unwanted sinusoidal noise, the high voltage plant comprising at least one of: a transformer, a transistor, and a high voltage multiplier;
      (ii) a plurality of filters wherein at least one filter of the plurality of filters is connected to the high voltage plant, the at least one filter of the plurality of filters forms a high voltage output;
      (iii) a high voltage divider to receive the high voltage output and generate a scaled voltage feedback signal;
      (iv) a processor with memory containing a plurality of operating set points, the processor connected to the low voltage and the high voltage plant, the processor configured to:
         (a) receive the scaled voltage feedback signal from the high voltage divider;
         (b) compare the scaled voltage feedback signal to the plurality of operating set points in the memory and generate a compared scaled voltage feedback signal;
         (c) compute and store in the memory, at least one revised operating set point using the compared scaled voltage feedback signal; and
         (d) use the at least one revised operating set point to simultaneously and automatically regulate the high voltage output to be within all operating set points of the plurality of operating set points.

2. The multi-controllable high voltage power supply of claim 1, comprising a digital communication in the memory of the processor, selecting between the at least one analog and digital set points or the analog communication selecting between the at least one analog and digital set points.

3. The multi-controllable high voltage power supply of claim 1, comprising a digital communication message in the memory of the processor indicating an input voltage and output voltage and an input current and output current.

4. The multi-controllable high voltage power supply of claim 1, comprising a digital fault message from the processor indicating fault conditions of the high voltage power supply comprising at least one of: input voltage outside predefined limits, overvoltage of output voltage, overcurrent of output power, and temperature exceeding an operating set point of the plurality of operating set points.

5. The multi-controllable high voltage power supply of claim 1, where the digital communication comprises a command to clear faults and resume the high voltage power supply.

6. The multi-controllable high voltage power supply of claim 1, wherein the processor simultaneously and automatically transmits an alert through a communication protocol or discrete input and output (I/O) signals.

7. The multi-controllable high voltage power supply of claim 1, wherein a data log comprises: at least one of: a fault count and run time using the digital communication.

8. The multi-controllable high voltage power supply of claim 1, comprising a current to voltage converter, providing a second feedback loop to the processor after receiving unwanted sinusoidal noise, which is used to adjust the at least one revised operating set point.

9. The multi-controllable high voltage power supply of claim 1, wherein output signals comprise a plurality of communications all operating simultaneously to convey different commands and data.

10. The multi-controllable high voltage power supply of claim 1, wherein the digital communication provides remote control of the high voltage power supply via a wireless communication to a user via a network.

11. The multi-controllable high voltage power supply of claim 1, comprising a first preset value for adjusting a speed at which an output voltage reaches the operating set point of plurality of operating set points after output is enabled of the high voltage power supply.

12. The multi-controllable high voltage power supply of claim 1, comprising a second preset value in the memory for adjusting a speed at which the output voltage is adjusted due to changing current load conditions.

* * * * *